April 2, 1963 R. S. ZEBARTH ETAL 3,083,810
GIBLET CONVEYOR
Filed Dec. 28, 1960 2 Sheets-Sheet 1

INVENTORS.
Ralph S. Zebarth
Robert D. Crawford
BY
Hovey, Schmidt, Johnson & Hovey
ATTORNEYS.

April 2, 1963  R. S. ZEBARTH ETAL  3,083,810
GIBLET CONVEYOR
Filed Dec. 28, 1960  2 Sheets-Sheet 2
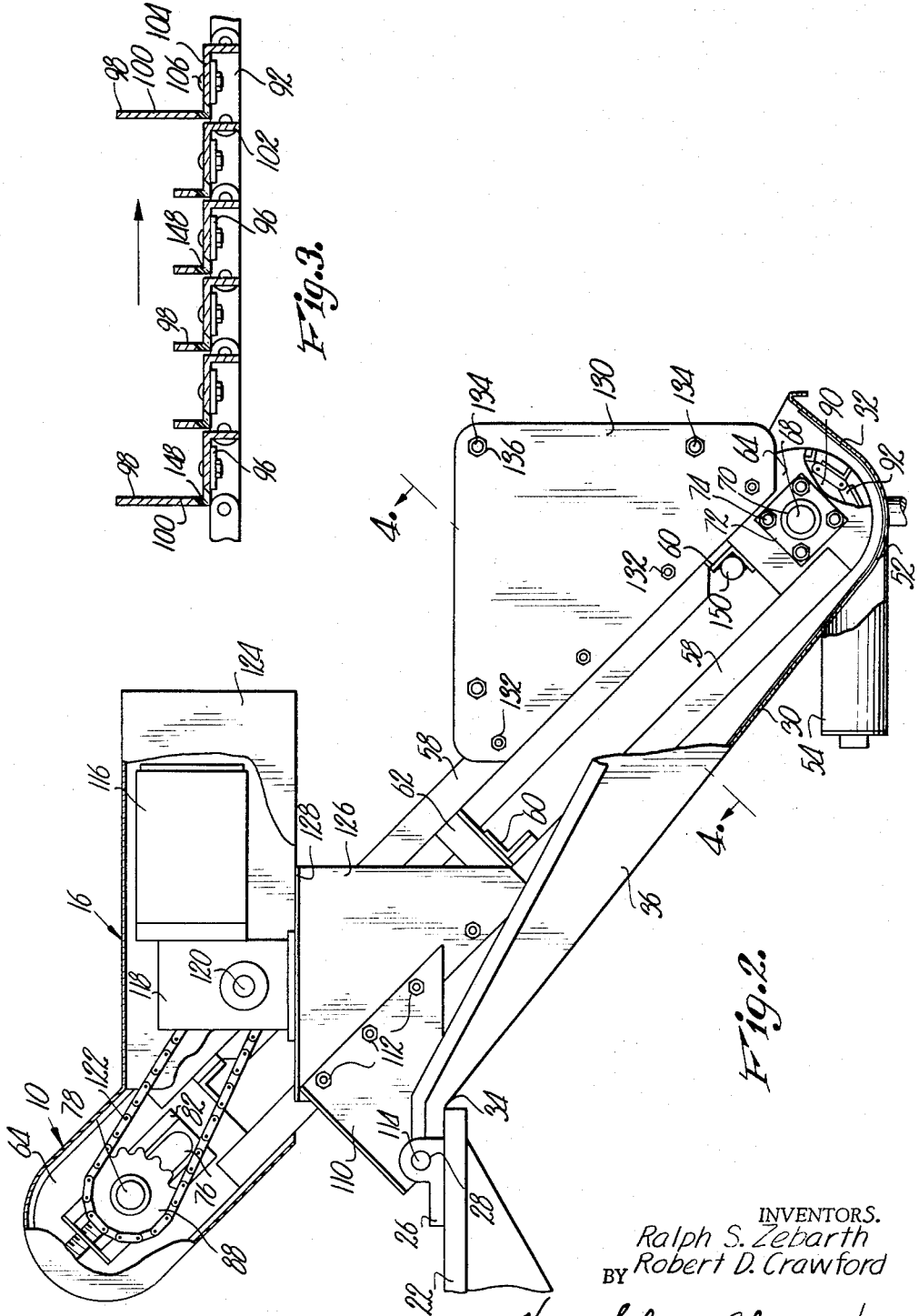
INVENTORS.
Ralph S. Zebarth
Robert D. Crawford
BY
ATTORNEYS United States Patent Office 3,083,810
Patented Apr. 2, 1963

3,083,810
GIBLET CONVEYOR
Ralph S. Zebarth, Kansas City, and Robert D. Crawford, Parkville, Mo., assignors to Gordon Johnson Company, Kansas City, Mo., a corporation of Missouri
Filed Dec. 28, 1960, Ser. No. 78,880
4 Claims. (Cl. 198—30)

This invention relates to conveyor units for transporting articles between two points and more particularly, to conveyor units for conveying assorted articles as the same are maintained in separate and distinct groups for handling purposes.

In the processing of poultry on a large scale, it is desirable that the giblets which are obtained during the evisceration stage of the process, be separated into distinct groups, for instance, the hearts in one group, the livers in a second group, and the gizzards in a third group. In maintaining the giblets separated into these groups, the same may be more effectively treated prior to the packaging thereof, either in separate containers or in small plastic bags inserted within the birds from which they originated.

There has been heretofore, no effective means of transporting giblets in separated groups between a handling zone and a treatment area, for the giblets have, in most cases, intermixed as the same move toward the treatment area. This is undesirable for the reason that the giblets must be separated at the treatment area, causing the expenditure of effort and thus reducing the efficiency of the processing of the poultry.

The present invention provides a conveyor unit for transporting giblets between a handling zone and a treatment area so that the giblets remain in a separated condition, thus facilitating the packaging of the giblets.

It is, therefore, the primary object of the present invention to provide a conveyor unit for transporting giblets from a handling zone to a treatment area in separated groups, which unit is provided with means for maintaining the separation of the giblets so that the same may be more effectively packaged after the same have been treated in the said area.

Another important object of the present invention is the provision of a conveyor unit for transporting giblets from a handling zone to a treatment area, which conveyor unit is provided with giblet retaining means thereon so that the giblets may not be returned to the zone as the same move toward said area.

Still another important object of the present invention is the provision of a conveyor unit having plate means thereon for separating the unit into a plurality of longitudinally extending regions adapted to receive giblets, whereby the giblets may be conveyed from a handling zone to a treatment area in said regions and thereby be maintained in separated groups during the transit thereof between zone and area.

Yet another important object of the present invention is the provision of a conveyor unit having a plurality of transversely disposed, longitudinally shiftable flights, each having a surface for carrying giblets and a surface for retaining the same thereon, whereby the giblets are effectively conveyed from a handling zone to a treatment area and the giblets are prevented from returning to the zone by virtue of the retaining surfaces of the flights.

A further important object of the present invention is the provision of a conveyor unit for conveying giblets saturated with a liquid, and which conveyor unit is provided with a liquid-receiving trough disposed below the conveying portion of the unit whereby the liquids drained from the giblets may be received by the trough and carried off thereby to a disposal point.

Other objects of the present invention relate to the provision of a conveyor unit including a frame swingably mounted on a support, whereby the frame may be raised to clean the unit during periods when the unit is not in use; to the provision of a pair of endless chains carried by the frame and operably coupled to a plurality of transversely extending flights, whereby the flights may be moved when the chains are shifted to thereby move the giblets longitudinally of the frame; to the provision of a plurality of projections on the chains for securing the latter to the flights, whereby the flights are moved positively under the influence of the chains; to the provision of a shaft longitudinally shiftable on the frame and carrying sprocket means operably coupled to the chains, whereby the tension on the chains may be increased or decreased as is desired; to the provision of a plurality of transversely extending, spaced plates providing separators for the conveyor unit and having edges extending in close proximity to the longitudinally shiftable flights, whereby the plates divide the flights into a plurality of giblet-receiving regions for maintaining the giblets in a separated condition as the same move under the influence of the flights; and to the provision of a plurality of transversely spaced slots in the flights adapted to clear the edges of the plates whereby the flights may be shifted relative to the plates without contacting the latter.

Other objects of the present invention will become apparent as the following specification progresses, reference being had to the accompanying drawings, wherein:

FIG. 2 is a fragmentary, cross-sectional, side elevational view of the conveyor unit illustrated in FIG. 1, which unit is shown in an operative position;

FIG. 3 is a fragmentary, enlarged, cross-sectional, side view of a chain and a plurality of flights forming a part of the present invention.

Figure 1:
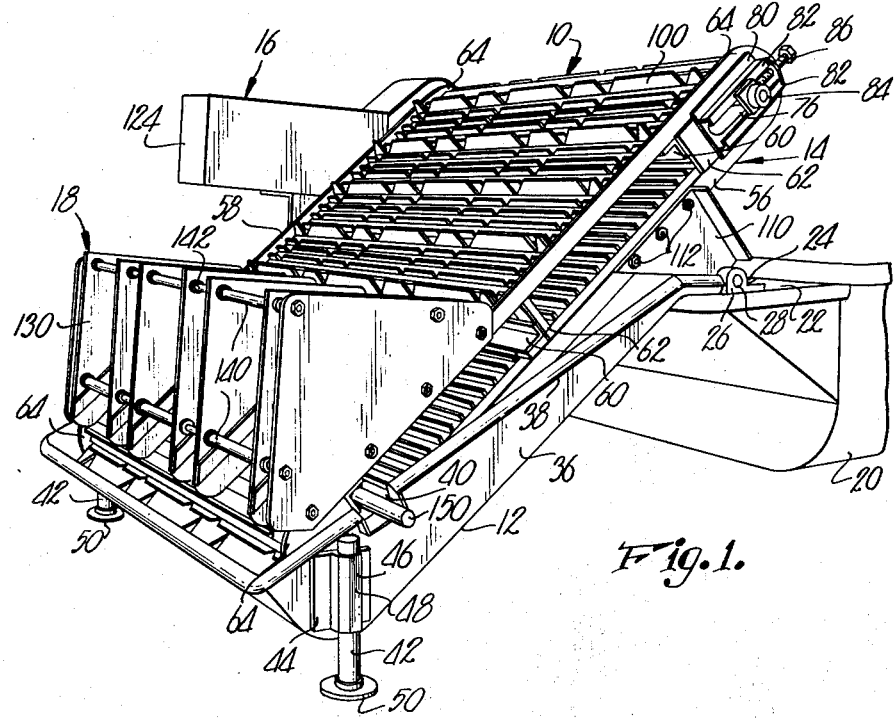
FIGURE 1 is a perspective view of the conveyor unit which is the subject of this invention, illustrating the separating means thereon for maintaining giblets in a separated condition as the same are transported by the unit.

The conveyor unit which is the subject of this invention, is broadly denoted by the numeral 10 and includes a liquid-receiving trough 12, a conveying device 14 disposed above trough 12, power operated means 16 operably coupled to conveying device 14 for actuating the latter, and separator means 18 for separating the conveying device 14 into a plurality of giblet-transporting regions.

In the present embodiment, conveyor unit 10 is adapted to be utilized with machines of the type disclosed in my copending application entitled "Machine for Continuous Cooling of Giblets," Serial No. 787,718, filed January 19, 1959, now Patent No. 3,022,646. In such a machine, giblets are introduced at one end thereof and the same are treated by reducing the temperature of the giblets prior to the removal thereof at the opposite end of the machine.

Conveyor unit 10 is adapted to transport giblets to the receiving end of the machine of the aforesaid pending application, which machine is provided with means for maintaining the giblets in a separated condition as the same are cooled and moved toward the opposite end thereof. Conveyor unit 10 is further adapted to be disposed at the opposite end of a machine of the aforesaid type for receiving treated giblets, and for transporting the same, for instance, to a second zone such as a packaging zone.

The machine with which conveyor unit 10 is to be utilized, is broadly denoted by the numeral 20 and is provided with a shelf 22 having an opening 24 therein for receiving articles such as giblets or the like. Machine 20 is suitably supported on a surface disposed therebelow and is provided with a bracket 26 at each of the sides of shelf 22 for a purpose hereinafter described. Bracket 26 is secured to shelf 22 by any suitable means such as by welding, and is provided with an aperture 28 therein which is aligned with the corresponding bracket 26 on the opposite side of shelf 22.

Trough 12 is adapted to be secured to shelf 22 and extend outwardly and downwardly from the latter. To this end, trough 12 is provided with a back 30 which is curved at one end thereof to provide a bottom 32 for trough 12, integral with back 30. As is clear in FIG. 2 of the drawings, back 30 is inclined relative to the upper surface of shelf 22 and back 30 is further provided with a bend 34 at the end thereof opposite to bottom 32 so that the opposite end conforms to the top surface of shelf 22. The opposite end, being the normally uppermost end of trough 12, is secured to shelf 22 in any suitable manner such as by welding. Secured to back 30 and bottom 32 is a pair of triangular-shaped sides 36, extending from shelf 22 to the marginal edges of bottom 32 to limit the flow of liquids which are received by trough 12. The uppermost marginal edges of bottom 32 and sides 36, are provided with flange means in the form of a continuous flange 38 extending from the upper end of one of the sides 36 along the upper edge of bottom 32, and back toward the upper end of the other of the sides 36.

A portion of each of sides 36 proximal to bottom 32, is removed to form a slot 40 for a purpose hereinafter described, slots 40 at the sides of trough 12 being aligned and spaced from bottom 32 as is clear in FIG. 1.

The lowermost end of trough 12 is provided with a pair of legs 42 secured to trough 12 by brackets 44 having sleeves 46 thereon for receiving legs 42 and disposing the latter in an upright position. A setscrew 48 in each of the sleeves 46, maintain legs 42 in fixed positions relative to the corresponding sleeves 46. Brackets 44 are secured to the respective sides 36 in any suitable manner such as by welding or the like. The lower ends of legs 42 are threaded so that the same may be mounted in annular discs 50 having central apertures provided with internal threads. Discs 50 are adapted to be bolted to a surface such as the floor below the conveyor unit 10 for securing trough 12 in a fixed position relative to machine 20.

Trough 12 is further provided with liquids outlet 52 communicating with an elongated pipe 54, which is adapted to be operably coupled to a sewer line. It is clear, therefore, that liquids gravitating into trough 12 will flow downwardly toward bottom 32 thereof, and into opening 52, out through pipe 54 to the sewer line.

Conveying device 14 includes a frame 56 comprised of a plurality of elongated, substantially parallel beams 58, beams 58 being arranged to form a box structure with a pair of beams 58 on each side of the structure. Beams 58 are substantially L-shaped with the beams on the normally upper side of frame 56 facing in the opposite direction from that of the beams 58 on the lower side of frame 56. Further, the beams are interconnected by crossbeams 60 at longitudinally spaced points on beams 58 to strengthen the box structure formed by the latter. Additionally, stub beams 62 are secured to the longitudinal beams 58 and the crossbeams 60 to further strengthen the box structure formed thereby.

Secured to the extremities of each end of frame 56 is a pair of plates 64, which plates 64 are mounted at said extremities of beams 58 in any suitable manner such as by welding or the like. The plates 64 disposed at the normally lowermost end of frame 56, are provided with apertures (not shown) therein for receiving an elongated shaft 68 extending transversely across frame 56. Each end of shaft 68 is journaled in the corresponding aperture by virtue of a collar 70 extending through the latter. Collar 70 is provided with a base 72 secured to the corresponding plate 64 by nut and bolt means 74.

The plates 64 secured to the normally uppermost end of frame 56, are provided with elongated, longitudinally extending slots 76 therein, through which the ends of a second shaft 78 project, it being clear that shaft 78 is adapted to shift within the slots 76 longitudinally of frame 56. Means are provided on plate 64 at the normally uppermost end of frame 56 for journaling the shaft 78 so that the latter may rotate relative to frame 56. To this end, a support 80 is secured to each of the plates 64 at the uppermost end of frame 56, which support 80 is provided with a pair of spaced tracks 82 which serve as guides for a collar 84 rotatably mounting the ends of shaft 78. Screw means 86 secured to collar 84 and operably coupled to support 80, is adapted to shift collar 84 and thereby shaft 78, longitudinally of frame 56 within the slots 76. Further, screw means 86, when adjusted, maintain shaft 78 in a fixed position relative to frame 56.

One end of shaft 78 is provided with a sprocket wheel 88 which extends outwardly from the corresponding support 80, and spaced from the latter so that no contact is made between sprocket wheel 88 with the tracks 82 of support 80. A pair of sprocket wheels 90 is secured to each of shafts 68 and 78 and is disposed thereon at points on the latter proximal to the ends thereof, it being clear that sprocket wheels 90 are mounted on the corresponding shafts so that the projecting teeth of the sprocket wheels 90, are aligned with the inwardly extending portions of beams 58. Sprocket wheels 90 are rigid to the corresponding shafts to rotate with the latter.

A pair of endless chains 92 is operably coupled with the sprocket wheels 90 and it is clear that each of the chains 92 is disposed proximal to a corresponding side of frame 56. Chains 92 therefore, shift longitudinally of frame 56 when shafts 68 and 78 rotate, and chains 92 shift substantially along the inwardly directed portions of beams 58, the latter serving as guides for chains 92. To reduce the wear on chains 92, plastic wear strips 94 are provided on the inwardly directed portions of beams 58, and chains 92 are supported by wear strips 94 when the same are moved longitudinally of frame 56.

Each link of each of chains 92 is provided with an inwardly directed projection 96 thereon with the projections on one chain 92 being aligned transversely with the projections on the other of chains 92.

A plurality of transversely extending flights 98 in the form of Z-shaped beams are operably coupled to chains 92 for movement therewith longitudinally of frame 56. Flights 98 are adapted to transport giblets from the lowermost end of frame 56 to the uppermost end thereof, and to retain the giblets thereon so that the same are prevented from returning to the lower end of frame 56. To this end, each flight 98 is provided with a pair of parallel stretches 100 and 102 respectively, and an interconnecting stretch 104 spanning the distance between stretch 100 and 102. Interconnecting stretch 104 is secured to the adjacent projection 96 by nut and bolt means 106 to dispose the flight 98 such that stretch 100 extends substantially upwardly and outwardly of frame 56 when viewing FIG. 1, and stretch 102 extends downwardly and inwardly relative to the latter. As illustrated in the drawings, the stretches 100 of flights 98 are variable in length between two limits. One of the flights 98 is provided with a stretch 100 which is greater in length than that of the flight adjacent thereto. Thereafter, this particular flight 98 is followed by four flights 98, having stretches 100 of a reduced length from that of the preceding stretch 100. Following the four flights with reduced stretches 100, comes a flight 98 having an extended stretch 100, as is clear in FIG. 3 of the drawings. Interconnecting stretches 104 are adapted to provide surfaces on which giblets may be placed for moving the giblets longitudinally of frame 56, and stretches 100 provide surfaces against which the giblets engage to retain the giblets on flights 98 and to prevent the same from returning to the lower end of frame 56.

Each of flights 98 is provided with a plurality of laterally spaced slots 108 therein for clearing portions of separating means 18 in a manner to be hereinafter described. Slots 108 are provided in stretches 100, as well as stretches 102, the slots in the latter being provided to clear a central beam 58 forming a part of frame 56.

Frame 56 is mounted on shelf 22 of machine 20 in an inclined position as shown in the drawings, by virtue of a pair of spaced supporting plates 110 mounted on each side of frame 56 to the lower beams 58 thereof by nut and bolt means 112. Supporting plates 110 are each provided with a collar (not shown) at an extremity thereof for receiving therethrough an elongated shaft 114, the latter being journaled in apertures 28 of brackets 26. By virtue of this construction, frame 56 is swingable about a horizontal axis toward or away from trough 12. This permits the operator of conveyor unit 10 to clean the conveying device 14, since access to the underside of the latter is had by swinging frame 56 so that the ends of the latter are at substantially the same elevation above the surface to which trough 12 is secured.

Power means 16 comprises an electric motor 116 adapted to be operably coupled to an electrical power source, and a gear reduction mechanism 118 operated off the shaft of motor 116 to turn a stub shaft 120 to which a sprocket wheel (not shown) is rigidly secured. An endless chain 122 is trained over sprocket wheel 88 on shaft 78 and over the sprocket wheel corresponding to gear reduction mechanism 118. Motor 116 and mechanism 118 is contained in a housing 124 secured to frame 56 by an upright standard 126 having a laterally extending flange 128 thereon in supporting relationship to housing 124. Standard 126 is secured to frame 56 by virtue of nut and bolt means 112, the latter also securing one of supporting plates 110 to the same beam 58.

Figure 4:
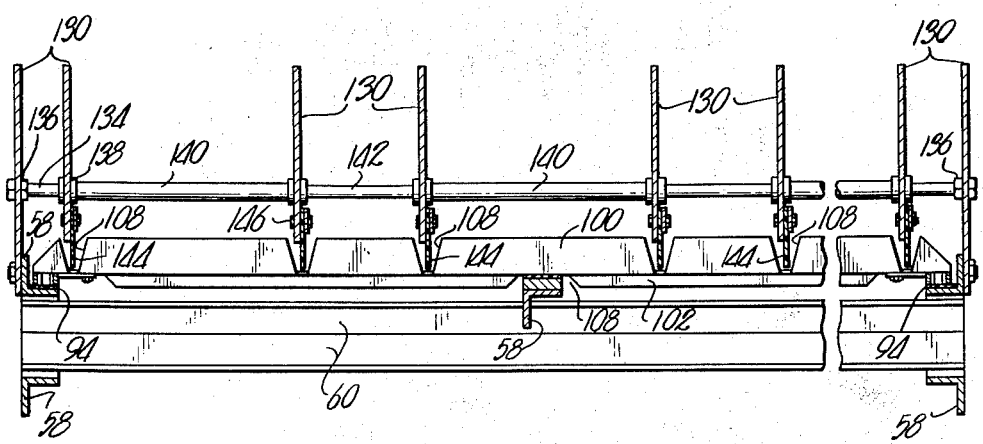
FIG. 4 is a cross-sectional, end elevational view taken along line 4—4 of FIG. 2.

Separator means 18 comprises a plurality of triangular-shaped, laterally spaced plates 130, the outermost plates 130 being secured to the normally upper beams 58 of frame 56 by nut and bolt means 132. The inner plates 130 are secured to the outer plates 130 by a plurality of transversely extending rods 134, threaded at the ends thereof to secure the same to the outer plates 130 by nuts 136 in the manner shown in FIG. 4 of the drawings. The inner plates 130 are provided with openings for receiving rod 134 and further, for receiving collars 138 substantially press-fitted in the openings of the inner plates 130. Elongated, tubular spacers 140 and 142 separate the inner plates 130, it being clear that spacers 140 are substantially greater in length than spacers 142. The plates 130 at each end of the spacers 140, define a giblet-receiving region and the portion of flights 98 disposed therebelow are adapted to receive giblets of an indentifiable group, such as livers, hearts, or gizzards. Spacers 142 define an inner region clearly spacing the regions defined by the spacers 140 so that giblets may not become intermixed when the same are placed on the flights 98.

The normally lowermost edges of the inner plates 130 are spaced slightly above interconnecting stretches 104 of flights 98, and are aligned with slots 108 of the latter. To extend the lower edge of plates 130 into close proximity with interconnecting stretches 104, each of plates 130 is provided with an extension 144 extending along the normally lower edge of the corresponding plate, and secured to the latter by nut and bolt means 146. Extensions 144 are preferably of a plastic material, such as nylon, which is highly wear-resistant, thus having a considerably long life.

In operation, conveyor unit 10 is disposed so that frame 56 is at an inclined position as shown in FIG. 1 of the drawings. In this position, giblets are deposited between the plates 130 defined by spacers 140, and upon actuation of motor 116, shaft 78 is caused to rotate about its longitudinal axis. Since chains 92 are trained over the sprocket wheels of shafts 68 and 78, the chains are caused to move longitudinally of frame 56 to thereby shift flights 98 longitudinally of frame 56 also.

The giblets deposited on flights 98 are carried from the end of frame 56 proximal to the bottom 32 of trough 12 to the upper end of frame 56, the latter being in substantially overlying engagement to the opening 24 in machine 20. The upright stretches 100 of flights 98 retain the giblets so that the same rest on the interconnecting stretches 104 and prevent the giblets from returning to the lower end of frame 56, as by tumbling. If the giblets have a tendency to "bunch" at the upright stretches 100 of decreased length, the same pass slightly rearwardly, but are retained by the stretches 100 of increased length. Thus, the giblets are effectively prevented from tumbling backwards.

By providing the plates 130 at the lower end of frame 56 and thus at the point of deposit of the giblets on flights 98, the giblets are initially shifted longitudinally of frame 56 in a substantially separated condition. By virtue of the extensions 144 on plates 130, the giblets are precluded from shifting transversely of flights 98 and when the giblets move beyond the plates 130, the giblets are properly aligned relative to the flights 98 so that there is no cross-over of giblets from one region to another.

As is clear in FIG. 3, the arrow denotes the direction of movement of flights 98 so that the interconnecting stretches 104 precede the stretch 100, serving to retain the giblets on stretch 104.

Each flight 98 is provided with a plurality of openings 148 therethrough for permitting liquids carried by the giblets, to drain off the latter and into trough 12 disposed therebelow. The liquids so drained, gravitate to the bottom of trough 12 and into the outlet 52 of the latter.

The tension on chains 92 may be effectively set so as to obtain the proper relationship to the spacings between flights 98. This is accomplished by adjusting screw means 86 to thereby shift shaft 78 longitudinally of frame 56 in slots 76.

When it is desired to clean the conveying device 14 after the same has been in operation over an extended time, the motor 116 is de-actuated and the frame 56 is rotated about shaft 114 so that the lower end is brought substantially to a level approximating the upper end thereof. To this end, an elongated rod 150 is rigidly secured to one of the crossbeams 60 proximal to the normally lowermost end of frame 56. The opposite ends of rod 150 project outwardly from frame 56 and rest in the slots 40 disposed in sides 36 of trough 12. Upon grasping the ends of rod 150, the operator of unit 10 may lift the lower end of frame 56 to rotate the latter about shaft 114 proximal to the opposite end thereof.

Although the conveyor unit 10 has been described as being utilized with machine 20 at the giblet-receiving end of the latter, it is clear that conveyor unit 10 may be utilized at the giblet-removing end of the latter. In this respect, the lower end of frame 56 is disposed so that the giblets, after being treated by machine 20, are deposited at the lower end of frame 56 on flights 98. Upon actuation of motor 116, the flights transport the deposited giblets to the opposite end of conveying device 14 under the influence of the rotation of shaft 78 motivated by the motor 116.

It is clear that conveyor unit 10 provides a means for maintaining the giblets in separate groups as the same are transported from a handling zone to a treatment area, since plates 130 effectively maintain the separation at least to a point where the giblets are oriented to the extent that the same may not shift laterally of the flights 98. Since stretches 104 of flights 98 are sufficiently narrow in longitudinal width, flights 98 provide a substantially flexible means for transporting the giblets so that the flights may be effectively mounted on chains 92 to move therewith over the sprocket wheels carried by shafts 68 and 78.

Having thus described the invention, what is claimed as new and desired to be secured by Letters Patent is:

1. In a conveyor unit for transporting assorted giblets from a handling zone to a treatment area in identifiable groups, said unit comprising an elongated frame adapted to span the distance between said zone and said area; a pair of endless chains; means carried by said frame and operably coupled with said chains for mounting the latter in spaced relationship on said frame and for moving the same longitudinally of said frame; means on said chains for interconnecting the same and for moving giblets from said zone to said area when said chains are moved under the influence of said mounting and moving means, said interconnecting and moving means having giblet retaining means thereon for preventing giblets from being returned to said zone as the same move toward said area; and plate means carried by said frame and extending upwardly therefrom at the end thereof adjacent said zone for separating said interconnecting and moving means into a plurality of spaced regions each adapted to receive giblets of an identifiable group, whereby said groups of giblets may be transported from said zone to said area while the same are confined in said regions.

2. In a conveyor unit for transporting assorted giblets from a handling zone to a treatment area in identifiable groups, said unit comprising an elongated frame adapted to be mounted with one end thereof proximal to said zone and the other end thereof proximal to said area; an elongated shaft for each end of said frame and rotatably mounted on the latter transverse to the longitudinal axis thereof; a pair of sprocket wheels secured to each shaft at opposed extremities thereof for rotation therewith relative to said frame; a pair of spaced, endless chains extending longitudinally of said frame and operably coupled with the sprocket wheels at corresponding extremities of said shafts for shifting movement longitudinally of said frames when at least one of said frames is rotated; power means connected with one of said shafts for rotating the latter; elongated structure connected to said chains and spanning the distance therebetween for moving giblets from said zone to said area when said chains are moved under the influence of said shafts and said sprocket wheels, said structure being provided with a first surface for carrying said giblets and a second surface for retaining said giblets on said first surface to prevent the return thereof to said zone as the same move toward said area; and plate means carried by said frame and extending upwardly therefrom at the end thereof adjacent said zone for separating said structure into a plurality of laterally adjacent regions each adapted to receive at said zone, giblets of an identifiable group, whereby the groups of giblets may be transported from said zone to said area while the same are confined in said regions.

3. In a conveyor unit as set forth in claim 2, wherein said plate means includes a pair of spaced plates corresponding to each region and providing limits for the latter to contain therebetween the corresponding group of giblets, each of said plates having an edge spaced from said structure in close proximity thereto to prevent the movement of giblets from the corresponding region to a region adjacent thereto.

4. In a conveyor unit for transporting giblets from a handling zone to a treatment area spaced above and beyond said zone, said unit comprising an elongated frame adapted to be mounted in an inclined position with one end thereof proximal to said zone and the other end thereof proximal to said area; an elongated shaft for each end of said frame and rotatably mounted on the latter transverse to the longitudinal axis thereof; a pair of sprocket wheels secured to each shaft at opposed extremities thereof for rotation therewith relative to said frame; a pair of spaced, endless chains extending longitudinally of said frame and operably coupled with the sprocket wheels at corresponding extremities of said shafts for shifting movement longitudinally of said frame when at least one of said shafts is rotated; power means connected with one of said shafts for rotating the latter and thereby said chains in a forward direction; means on said chains for interconnecting the same and for moving giblets from said zone to said area when said chains are moved under the influence of said shafts and said sprocket wheels, said means including a plurality of elongated, transversely disposed flights, each provided with a generally upright stretch and a giblet supporting stretch normal to and extending outwardly from said upright stretch, the outermost edges of said supporting stretches being in relatively close proximity to the upright stretches of adjacent flights, said upright stretches being disposed for preventing giblets from being returned to said zone as the same move toward said area; and an elongated trough adapted to be supported at the ends thereof at said zone and said area respectively, and disposed below said frame to receive liquids drained from said giblets as the same are moved from said zone to said area, said frame being swingable relative to said trough adjacent one end of the latter for movement toward and away from the trough to facilitate cleaning of said frame and said flights.

References Cited in the file of this patent
UNITED STATES PATENTS

| | | |
|---|---|---|
| 758,274 | Pace | Apr. 26, 1904 |
| 897,462 | Hanak | Sept. 1, 1908 |
| 1,604,402 | Fleischer | Oct. 26, 1926 |
| 2,714,257 | Reading | Aug. 2, 1955 |
| 2,841,817 | Murphy | July 8, 1958 |
| 2,955,696 | Spooner | Oct. 11, 1960 |